US006600700B1

(12) United States Patent
Machida et al.

(10) Patent No.: US 6,600,700 B1
(45) Date of Patent: Jul. 29, 2003

(54) DIGITAL AUDIO DISC RECORDER

(75) Inventors: Kazuhisa Machida, Kawasaki (JP); Atsushi Ishibashi, Kokubunji (JP); Tsugio Endou, Hachioji (JP); Tadahiko Sakamoto, Kawasaki (JP); Hideki Ikeda, Yokohama (JP); Atsushi Oonishi, Yokohama (JP)

(73) Assignee: Denon, Ltd., Tokyo (JP)

( * ) Notice: Subject to any disclaimer, the term of this patent is extended or adjusted under 35 U.S.C. 154(b) by 246 days.

(21) Appl. No.: 09/712,910

(22) Filed: Nov. 16, 2000

(30) Foreign Application Priority Data

Nov. 16, 1999 (JP) ............................. 11-325663

(51) Int. Cl.⁷ ............................................. G11B 21/08
(52) U.S. Cl. ..................................... 369/30.19; 386/54
(58) Field of Search .................... 369/30.19, 30.05, 369/30.08, 30.27; 386/52, 54, 55, 56

(56) References Cited

U.S. PATENT DOCUMENTS

| | | | | |
|---|---|---|---|---|
| 5,182,640 A | * | 1/1993 | Takano | 358/86 |
| 5,267,351 A | * | 11/1993 | Reber et al. | 395/600 |
| 5,699,483 A | * | 12/1997 | Tanaka | 704/219 |
| 5,892,536 A | * | 4/1999 | Logan et al. | 348/13 |
| 6,134,378 A | * | 10/2000 | Abe et al. | 386/52 |
| 6,223,210 B1 | * | 4/2001 | Hickey | 709/203 |

FOREIGN PATENT DOCUMENTS

JP    11-136202 A   *  5/1999

* cited by examiner

*Primary Examiner*—Tan Dinh
(74) *Attorney, Agent, or Firm*—Mattingly, Stanger & Malur, P.C.

(57) ABSTRACT

Disclosed is a digital audio disk recorder with improved ease of use, which can easily and efficiently superimpose a take of a short sound during broadcasting. In order to output takes of a plurality of short sounds, buttons "Key Name" corresponding to the takes of the sounds are displayed on a display screen for monitoring a state of broadcasting. By operating any of the buttons during broadcasting of a program for broadcasting displayed as a play list, the take of the short sound assigned to the button can be superimposed on a signal being broadcasted.

4 Claims, 18 Drawing Sheets

DIGITAL AUDIO DISC RECORDER

BACKGROUND OF THE INVENTION

The present invention relates to a digital audio disk recorder and, more particularly, to a digital audio disk recorder for storing input analog or digital audio information such as music or voice as digital information into a recording medium such as an MO disk or DVD, editing the audio information stored in the recording medium, storing the edited information into the recording medium, and either reproducing and broadcasting the audio information in accordance with the edited information or generating a series of audio signals for broadcasting.

Generally, a digital audio disk recorder which is installed and used in a broadcast station or the like has: a digital signal processor for digitally processing an audio signal; a controller for controlling a recording medium, input/output of operating information, and an interface with the digital signal processor; and a keyboard having various keys and a display for displaying a work state or the like, which serve as a man-machine interface. The digital audio disk recorder can perform a process of editing an audio signal such as music or voice, a process of reproducing and broadcasting the audio signal, a process of inserting a signal such as a special sound, and the like.

The conventional digital audio disk recorder lacks ease of use in a work of reproducing and broadcasting audio information or generating a series of audio signals for broadcasting, and has a problem that it is difficult to do an efficient work.

SUMMARY OF THE INVENTION

It is an object of the invention to solve the problem of the conventional technique and to provide a digital audio disk recorder capable of easily and efficiently performing a work of reproducing and broadcasting an audio signal or a generating a series of audio signals for broadcasting with improved ease of use.

According to the invention, the object is achieved by a digital audio disk recorder having a display for displaying a state of broadcasting and a recording and reproducing apparatus, for creating an on-air file by an edited audio signal recorded in the recording and reproducing apparatus and broadcasting the on-air file, provided with the function of holding takes of a plurality of short sounds and outputting the take of short sound during broadcasting. The object is also achieved by displaying soft buttons corresponding to the takes of sounds on the screen of the display in order to output any of the takes of the plurality of short sounds.

According to the invention, the object is achieved as follows. When the on-air file is created as a play list of a plurality of project files and a project file is added to the play list, each of start and end of the project file to be added is designated by time or a position in placement of a plurality of takes included in the file.

Further, according to the invention, the object is achieved by a digital audio disk recorder, wherein the recording and reproducing apparatus has an MO device and an operating device, and the MO drive is provided on the front face of the operating devise.

These and other objects, features and advantages of the present invention will become more apparent in view of the following detailed description of the preferred embodiments in conjunction with accompanying drawings.

BRIEF DESCRIPTION OF THE DRAWINGS

FIG. 16 is a view showing a second example of a screen displayed on a display in the case of performing a process of assigning takes of various short sounds to a number of buttons of a quick play commander according to the embodiment of the invention.

FIG. 17 is a view showing a third example of a screen displayed on a display in the case of performing a process of assigning takes of various short sounds to a number of buttons of a quick play commander according to the embodiment of the invention.

DESCRIPTION OF THE PREFERRED EMBODIMENTS

Digital audio disk recorders according to embodiments of the invention will be described in detail hereinbelow with reference to the drawings.

Figure 1:
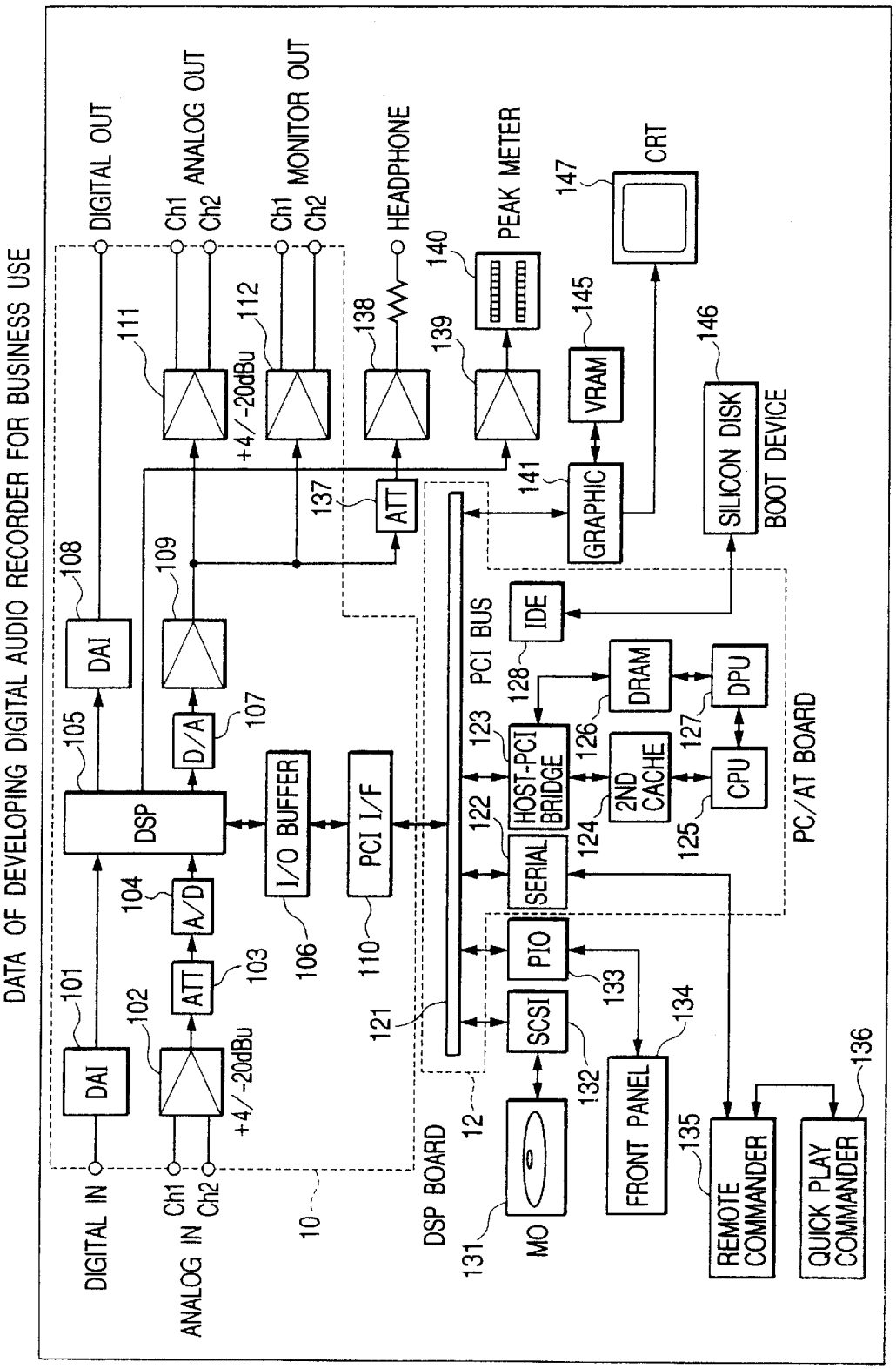
FIG. 1 is a block diagram showing the configuration of a digital audio disk recorder according to an embodiment of the invention.
Figure 2:
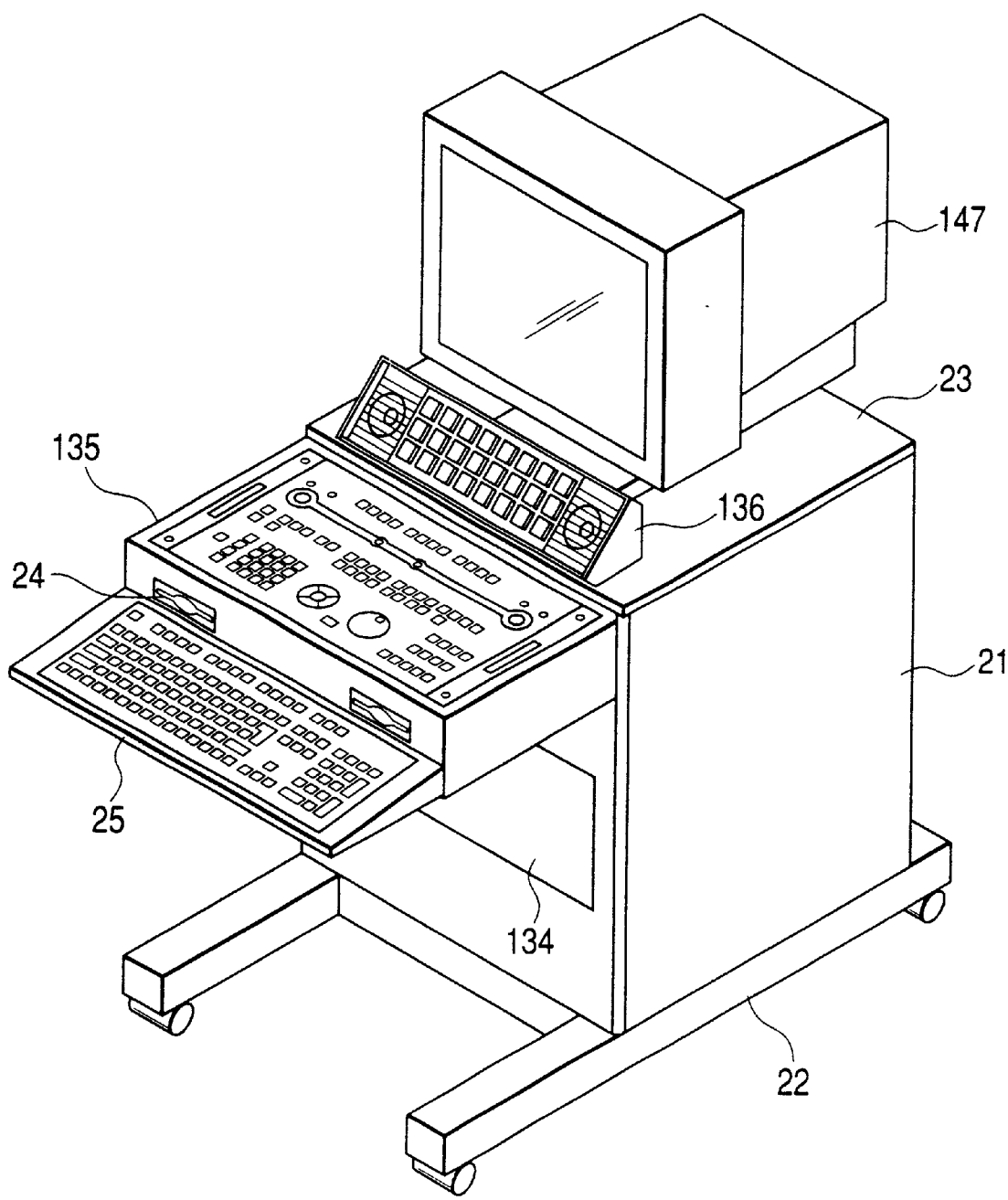
FIG. 2 is a perspective view showing the appearance of the digital audio disk recorder according to the embodiment of the invention.
Figure 3:
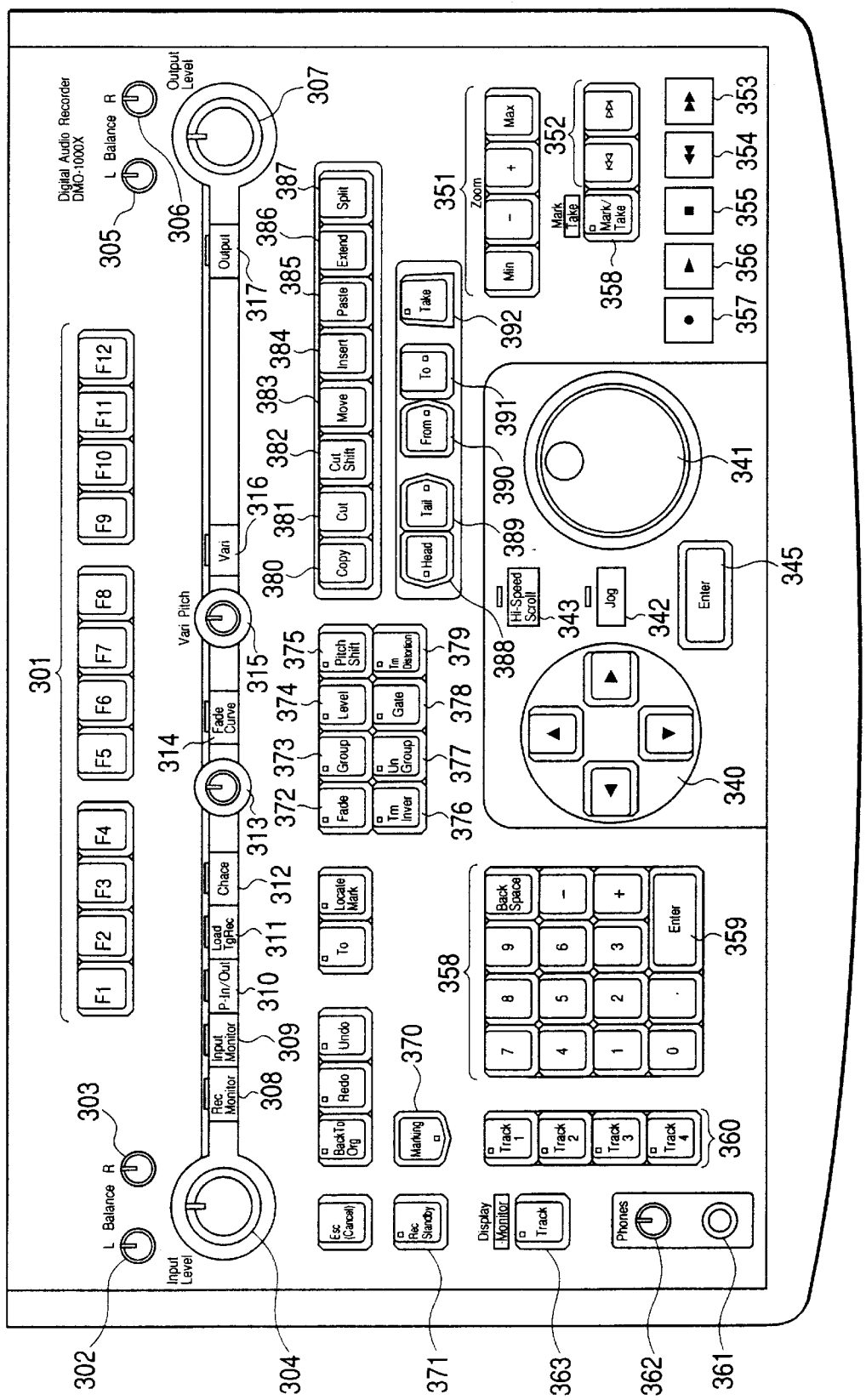
FIG. 3 is a view for explaining key placement of a panel of a remote commander.
Figure 4:
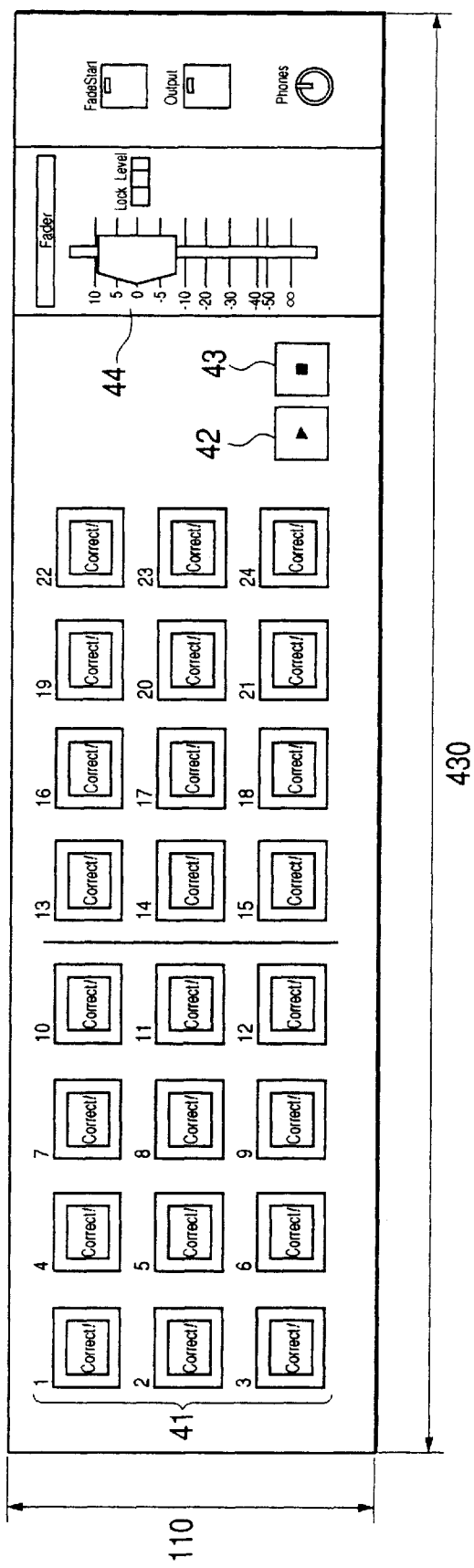
FIG. 4 is a view for explaining key placement of a panel of a quick play commander.

FIG. 1 is a block diagram showing the configuration of a digital audio disk recorder according to an embodiment of the invention. FIG. 2 is a perspective view showing the appearance of the digital audio disk recorder according to the embodiment of the invention. FIG. 3 is a view for explaining key placement of a panel of a remote commander. FIG. 4 is a view for explaining key placement of a panel of a quick play commander. The outline of a digital audio disk recorder to which the invention is applied will be described hereinbelow with reference to the drawings. Shown in FIGS. 1 to 4 are a DSP (Digital Signal Processor) board 10, a PC/AT board 12, DAIs (Digital Audio Interfaces) 101 and 108, amplifiers 102, 109, 112, 138 and 139, ATT (Attenuators) 103 and 137, an A/D (analog-to-digital) converter 104, a DSP 105, an I/O buffer 106, a D/A (digital-to-analog) converter 107, a PCI (Peripheral Component Interconnect) I/F 110, aPCI bus 121, a serial I/0122, a host-PCI bridge 123, a second cache 124, a CPU 125, a DRAM 126, a DPU (Digital Processing Unit) 127 which controls memories, an IDE (Integrated Drive Electronics) 128, an MO device 131, an SCSI I/O 132, a parallel I/O 133, a front panel 134, a remote commander 135, a quick play commander 136, a peak meter 140, a graphic interface 141, a V (Video) RAM 145, a boot device 146, a display 147, a body casing 21, legs 22, a top plate 23, an MO drive 24, and a JIS keyboard 25.

As shown in FIG. 1, main elements of the digital audio disk recorder according to the embodiment of the invention are: the DSP board 10 for performing various processes such as a process of editing an audio signal; a PC/AT board 12 for controlling connection with an external device, or the like; the MO device 131 for storing an audio signal, edited information, and the like; the remote commander 135 used for controlling editing, transmission, and the like of the audio signal; the quick play commander 136 for inserting a signal of a special sound during transmission of the audio signal; and the display 147 for displaying the edited information and the like.

In the embodiment of the invention constructed as described above, an input digital audio signal is supplied to the DSP 105 via the DAI 101. An analog audio signal is supplied to the DSP 105 via the amplifier 102, ATT 103, and A/D converter 104. The DSP 105 receives operation information from the remote commander 135 via the serial I/O 122, PCI bus 121, PCI I/F 110, and I/O buffer 106, performs a process on the input digital audio signal in accordance with the information, and either records the processed signal to the MO device 131 or outputs the information to the outside.

When recording of the input digital audio signal to the MO device 131 is instructed, the DSP 105 transmits and records the digital audio signal to the MO device 131 via the I/O buffer 106, PCI I/F 110, PCI bus 121, and SCSI I/O 132. When it is instructed to output the input digital audio signal to an external device, the DSP 105 outputs the digital audio signal as it is to the external device via the DAI 108 or converts the digital audio signal into an analog signal by the D/A converter 107 and outputs the analog signal to the external device via the amplifier 109 and the amplifier 111 or 112. The output signal is supplied to the peak meter 140 via the amplifier 139 so that the signal level can be monitored. The output signal can be outputted to a headphone via the attenuator 137 and the amplifier 138, and the operator can monitor the signal level. The DSP 105 can also edit the digital audio signal recorded in the MO device 131 while reproducing the signal in accordance with operation information supplied from the remote commander 135 and record the edited information to the MO device 131.

The PC/AT board 12 controls various kinds of interfaces related to the processes in the DSP 105. The PC/AT board 12 interfaces to the DSP board 10 via the PCI bus 121. The audio signal and the edited information is written/read to/from the MO device 131 via the SCSI I/O 132, and the control of the MO device 131 and the control of the power source of the whole device are performed via the front panel 134 and the parallel I/O 133. The remote commander 135 and the quick play commander 136 for inserting a signal of a special sound during the transmission of the audio signal interface with each other via the serial I/O 122. The display 147 for displaying information necessary for editing or the like is controlled via the VRAM 145 and the graphic interface 141.

The control of the interfaces is executed by a processing unit including the CPU 125, DRAM 126 as a main storage, DPU 127, second cache 124, and host-PCI bridge 123. A program for controlling the processing unit, and the like are stored in the boot device 146 which takes the form of a flash memory or the like, read by the IDE 128, stored in the DRAM 126, and used.

In the digital audio disk recorder whose appearance is as shown in FIG. 2, the display 147 and the quick play commander 136 having therein speakers are placed on the top plate 23 on the body casing 21 having the legs 22. The remote commander 135 is detachably attached on the front face of the body casing 21 and, further, the JIS keyboard 25 is detachably attached to the front face of the remote commander 135. The JIS keyboard 25 is used in cases such that characters have to be entered during an editing process, and that a process except for the editing process such as a process by the PC is necessary. In the example of FIG. 2, the remote commander 135 is provided with two MO drives 24. The front panel 134 in which a power supply unit, a power switch, and the like are arranged is assembled in the body casing 21. The front panel 134 is also provided with the MO drive 24. The MO drive 24 provided for the front panel 134 is the one conventionally provided. When the remote commander 135 is attached to the front face of the body casing 21 as in the embodiment of the invention, the ease of use deteriorates. In the embodiment of the invention, therefore, the MO drives are provided for the remote commander 135 for ease of use. The body casing 21 is not limited to the shape shown in the diagram but can have other shapes such as a box so that it can be installed on or below a table.

The MO drive 24 provided for the remote commander 135 is arranged so as to be used even when the portion of the remote commander 135 is detached and carried to another place.

The key placement of the panel of the remote commander 135 is shown in FIG. 3 and the remote commander 135 is used for recording, editing, and reproduction. In FIG. 3, a group 301 of function keys (F1 to F12) arranged in the upper part of the panel is used to execute a function displayed on the display for displaying a state or the like at the time of recording, editing, or reproduction in correspondence with a button to which a function usable at that time point is assigned. On the lower right and left sides of the group 301 of function keys, knobs 303 and 302 for balancing right and left inputs, a knob 304 for input level adjustment, knobs 306 and 305 for balancing right and left outputs, and a knob 307 for output level adjustment are disposed.

Keys and knobs 308 to 317 used for various processes of the invention are disposed between the knob 304 for input level adjustment and the knob 307 for output level adjustment. Below the keys and knobs, a number of keys for, calling takes, setting the state for a called take, selecting contents of a process to be added, and the like at the time of editing the audio signal are disposed. In the center below the keys, crosshairs cursor keys 340, a jog dial 341, a key 342 for switching between the crosshairs cursor keys 340 and the jog dial 341, a high-speed scroll key 343, and an enter key 344 are arranged. On the right side of the group of keys, a group 351 of zoom keys as one-touch keys for changing the level and time base, a stop key 352, and a group of keys 353 to 357 such as fast-forward, recording, reproduction, and stop are disposed. On the left side, a ten-key numerical pad 358 for entering numbers, an enter key 359, a group 360 of track selection keys for selecting whether a track is displayed or not, a headphone jack 361, a level adjustment knob 362, a monitor key 363 for setting on/off of a monitor, which is used together with the group 360 of track selection keys for selecting whether a track is displayed or not, and the like are arranged.

The invention relates to a process for reproducing and broadcasting an audio signal which is recorded and edited in the digital audio disk recorder, or generating a series of audio signals for broadcasting. All of the keys and knobs disposed on the remote commander 135 shown in FIG. 3 are not always used. The functions of the keys and knobs will be described as necessary in the processing operation.

The key placement is characterized in that operations of both recording and reproduction can be performed by using a plurality of keys in and on both sides of the area where the crosshairs cursor keys 340 and the jog dial 341 are disposed, that is, the keys disposed in the lower part of the panel of the remote commander. It is also characteristic that a group of keys 388 to 392 used to select a take (object) for editing are disposed on the upper side of the jog dial 341, and a group of keys 372 to 378 for designating a processing method (action) for editing are disposed on the upper side of the group of keys 388 to 392.

In the panel of the quick play commander 136 shown in FIG. 4, a group 41 of keys to which takes of various short sounds such as sound of clapping, sound of rain, and (effect sound indicating whether an answer to a quiz is correct or incorrect) are assigned, a reproduction key 42, a stop key 43, a level adjustment knob 44, a fade start key 45, an output on/off key 46, and the like are arranged. When an edited audio signal is reproduced, outputted and broadcasted, the quick play commander 136 is used at a necessary time point during broadcasting in such a manner that the operator selects a take of a sound desired to be generated and superimposes the take on the audio signal.

FIGS. 5 to 14 are diagrams each showing an example of the screen displayed on the display 147 when a process of reproducing and broadcasting the recorded and edited audio signal or generating a series of audio signals for broadcasting is performed according to the embodiment of the invention. The process of reproducing and broadcasting the recorded and edited audio signal or generating a series of audio signals for broadcasting according to the embodiment of the invention will be described with reference to the drawings.

Figure 5:
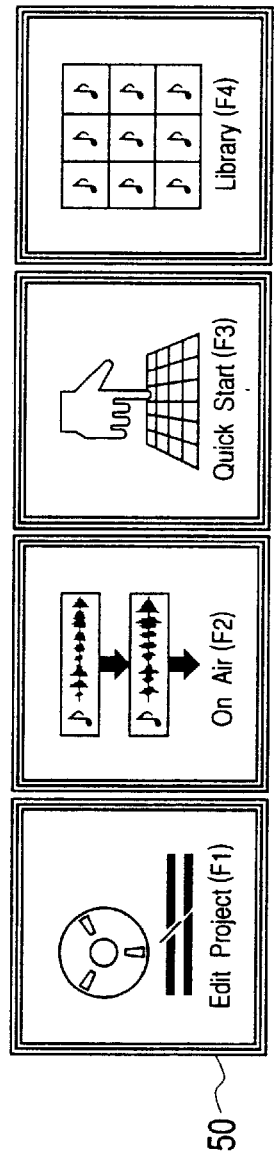
FIG. 5 is a view showing a first example of a screen displayed on a display in the case of performing a process of reproducing and broadcasting an audio signal or generating a series of audio signals for broadcasting according to the embodiment of the invention.
Figure 5:

When the power of the digital audio disk recorder (hereinbelow, simply referred to as a system) according to the embodiment of the invention is turned on and the system is activated, an initial screen as shown in FIG. 5 is displayed on the display 147. On the initial screen, a menu for selecting a process in the system according to the embodiment of the invention is displayed. As the menu, "edit project" for recording and editing a take, "on-air" for combining some of the edited audio signals and arranging and reproducing the signals in order of time, "quick start" for outputting an audio signal of a special sound such as clapping sound, (sound indicating whether an answer to a quiz is correct or incorrect) or sound of laughter, held in correspondence with the key in the quick start commander 136, and "library" for storing and managing various information such as audio signal takes and edited information are displayed.

In the lower part of the display screen, key icons 502 corresponding to the group 301 of function keys in the remote commander 135 are displayed and the functions of the keys are displayed in the icons. In the example shown the diagram, the keys F1 to F4 in the group 301 of function keys for selecting the menus are assigned to the menus. The function of turning the power off is assigned to the key F12.

When the operator performs one of an operation of selecting the key F2 in the group 301 of function keys in the remote commander 135, an operation of both the ten-key numerical pad 358 and the enter key 345 on the remote commander 135, and an operation of moving a colored cursor indicative of selection to a key icon desired to be selected by operating the crosshairs cursor keys 340 in the lateral direction and pressing the enter key 345, the process of reproducing and broadcasting the audio signal or generating a series of audio signals for broadcasting as the process of "On Air" can be started. The display screen as shown in FIG. 6 is obtained.

Figure 6:
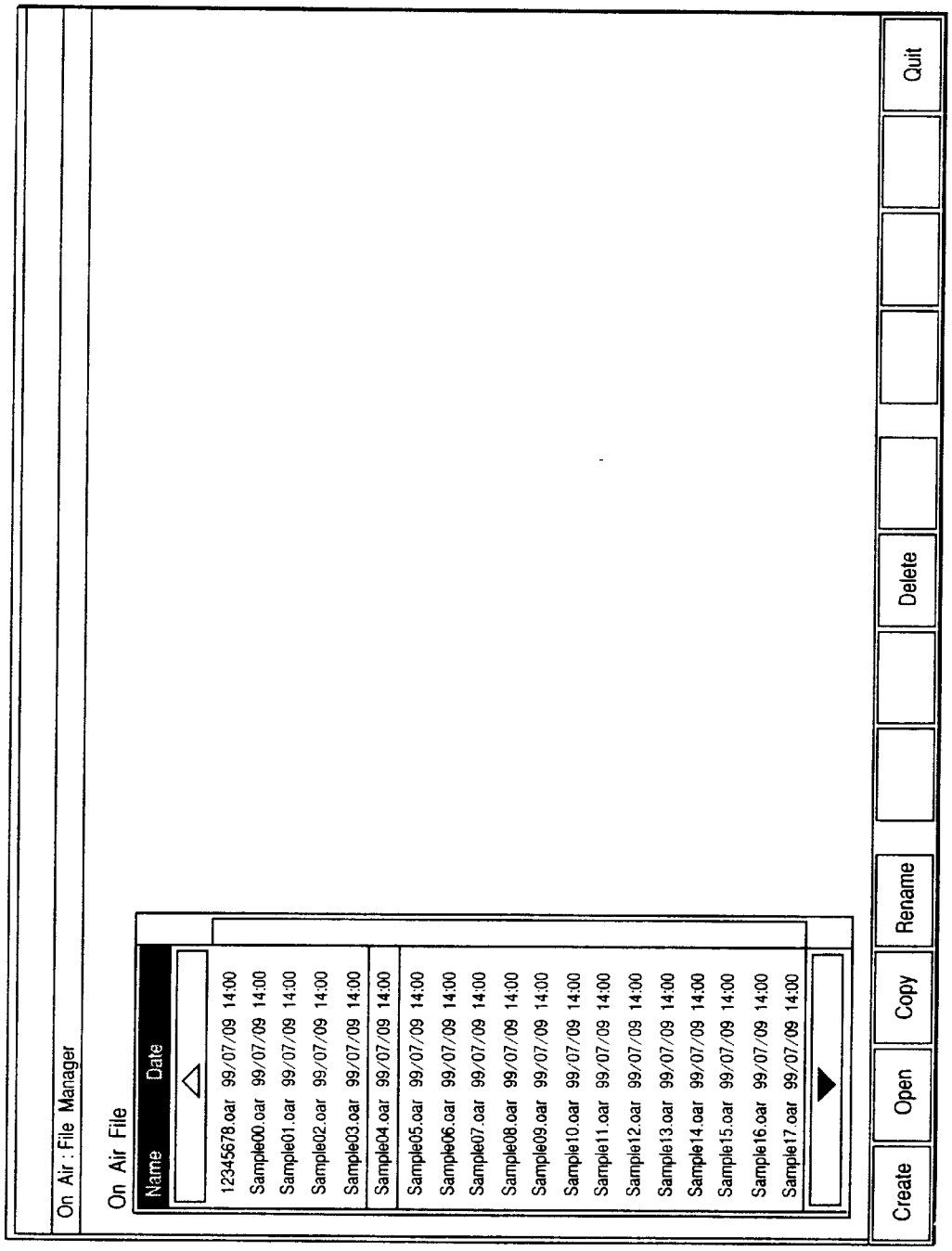
FIG. 6 is a view showing a second example of a screen displayed on a display in the case of performing a process of reproducing and broadcasting an audio signal or generating a, series of audio signals for broadcasting according to the embodiment of the invention.

The screen shown in FIG. 6 is used to select information already edited and stored in the MO device 131 and to advance to the next process. On the display screen, the name of the display screen, that is, "file manager" in this example and a list of a plurality of variously named on-air files of the information which is already edited and stored in the MO device 131 and which can be broadcasted are displayed. Processing operations are assigned to the function keys. In the example shown in FIG. 6, "Create" indicative of creation of a new file, that is, creation of an on-air file is assigned to the key F1, "Open" of a file is assigned to the key F2, "Copy" of copying a file under a different name is assigned to the key F3, "Rename" of the name of a file is assigned to the key F4, and "Delete" indicative of deletion of a file is assigned to the key F7. The function of "Quit" of returning to the initial screen shown in FIG. 5 is assigned to the key F12. A file can be selected by operating the crosshairs cursor keys 340 in the vertical direction. By operating the key F2 to which the function of "Open" is assigned, the selected file can be called.

Figure 7:
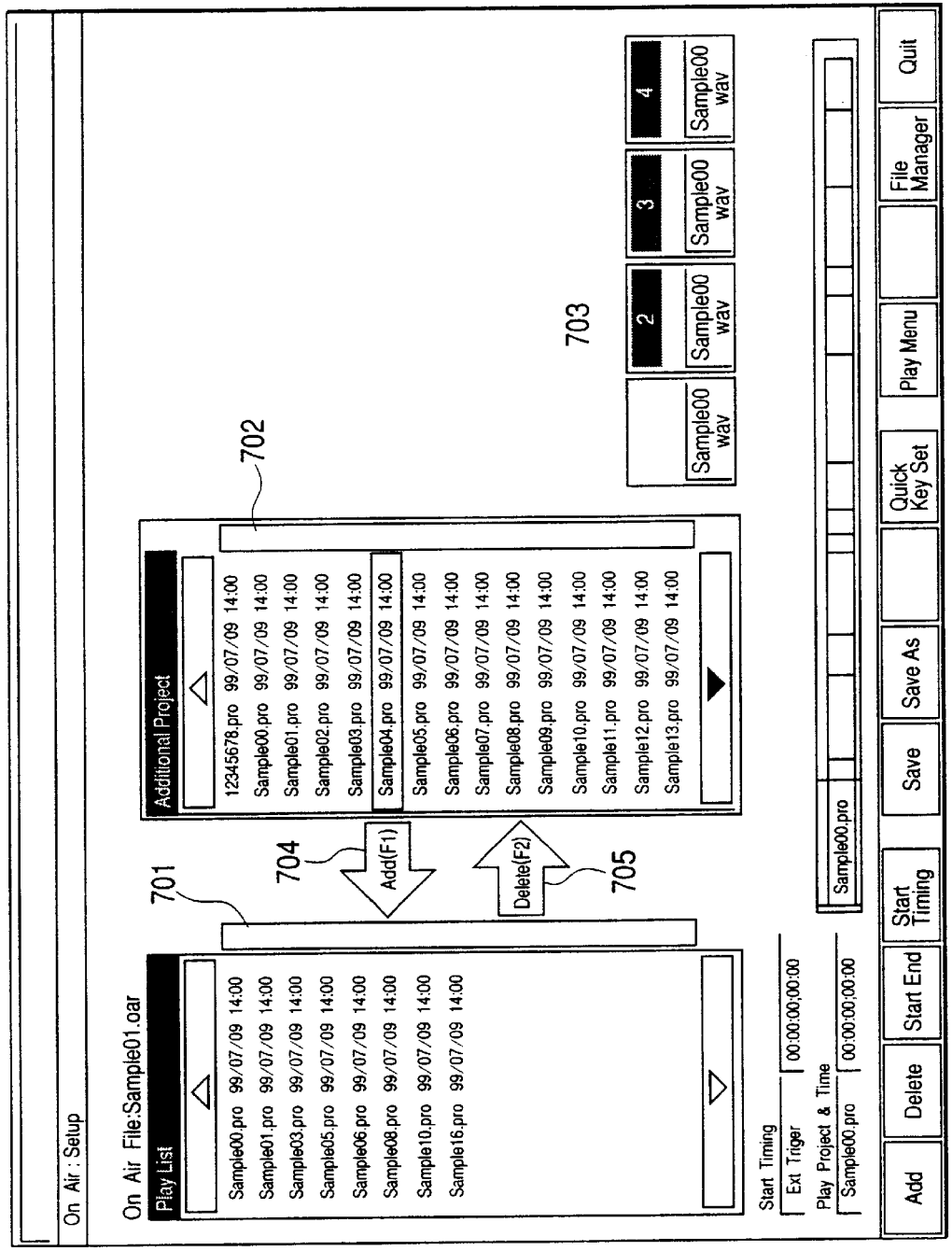
FIG. 7 is a view showing a third example of a screen displayed on a display in the case of performing a process of reproducing and broadcasting an audio signal or generating a series of audio signals for broadcasting according to the embodiment of the invention.

When the operator selects one of the files and operates the key F1 to which "Create" is assigned in order to create a new on-air file, a window (not shown) to enter a new file name is displayed on the display screen. When the operator enters a file name, the file name is added to the on-air file shown in FIG. 6. After that, by operating the key F2 to which the function of "Open" is assigned, the screen is changed to a screen as shown in FIG. 7. On the screen, a play list 701 as a program list included in the file selected in FIG. 6, an additional project 702 as a list of programs which can be inserted to the play list 701, and buttons 703 for setting takes of various short sounds such as sound of clapping, sound of rain, and (sound indicating whether an answer to a quiz is correct or incorrect) from the quick play commander 136 which has been described by referring to FIG. 4 are mainly displayed. The operator creates a play list of on-air files to be created in the screen. In the display screen, the name of the screen, that is, "Setup" in the example is displayed.

The following processing operations are assigned to the function keys. In the example shown in FIG. 7, "Add" of adding a program in the additional project 702 to the play list 701 is assigned to the key F1, "Delete" of deleting a program in the play list 701 is assigned to the key F2, "Start End" of designating a part in a plurality of takes included in the program or a time period to be used is assigned to the key F3, "Start Timing" of setting a start timing is assigned to the key F4, "Save" of saving set information of a displayed project is assigned to the key F5, "Quick Key Set" of setting takes of various short sounds, which can be controlled by the quick play commander 136 is assigned to the key F8, and "Play Menu" of returning the screen to the play menu is assigned to the key F9. The function of "File Manager" of returning to the project manager shown in FIG. 6 is assigned to the key F11. The function of "Quit" of returning to the initial screen shown in FIG. 5 is assigned to the key F12. The assigning states of the keys F1 and F2 are displayed as icons 704 and 705 of arrows in the display screen.

The quick play commander 136 is used to assign takes of various short sounds to a number of buttons provided for the device and manage or control the takes of sounds. The takes of sounds themselves are stored in the MO device 131.

The operator selects the play list 701 or the additional project 702 by using the right or left key in the crosshairs cursor keys 340 in the display screen shown in FIG. 7, selects a program in the play list 701 or the additional project 702 by using the upper or lower key, and either adds the selected program from the additional project 702 to the play list 701 by using the key F1 to which "Add" is assigned or deletes the selected program in the play list 701 by using the key F2 to which "Delete" is assigned and moves the deleted program to the additional project 701, thereby creating a new play list.

Figure 8:
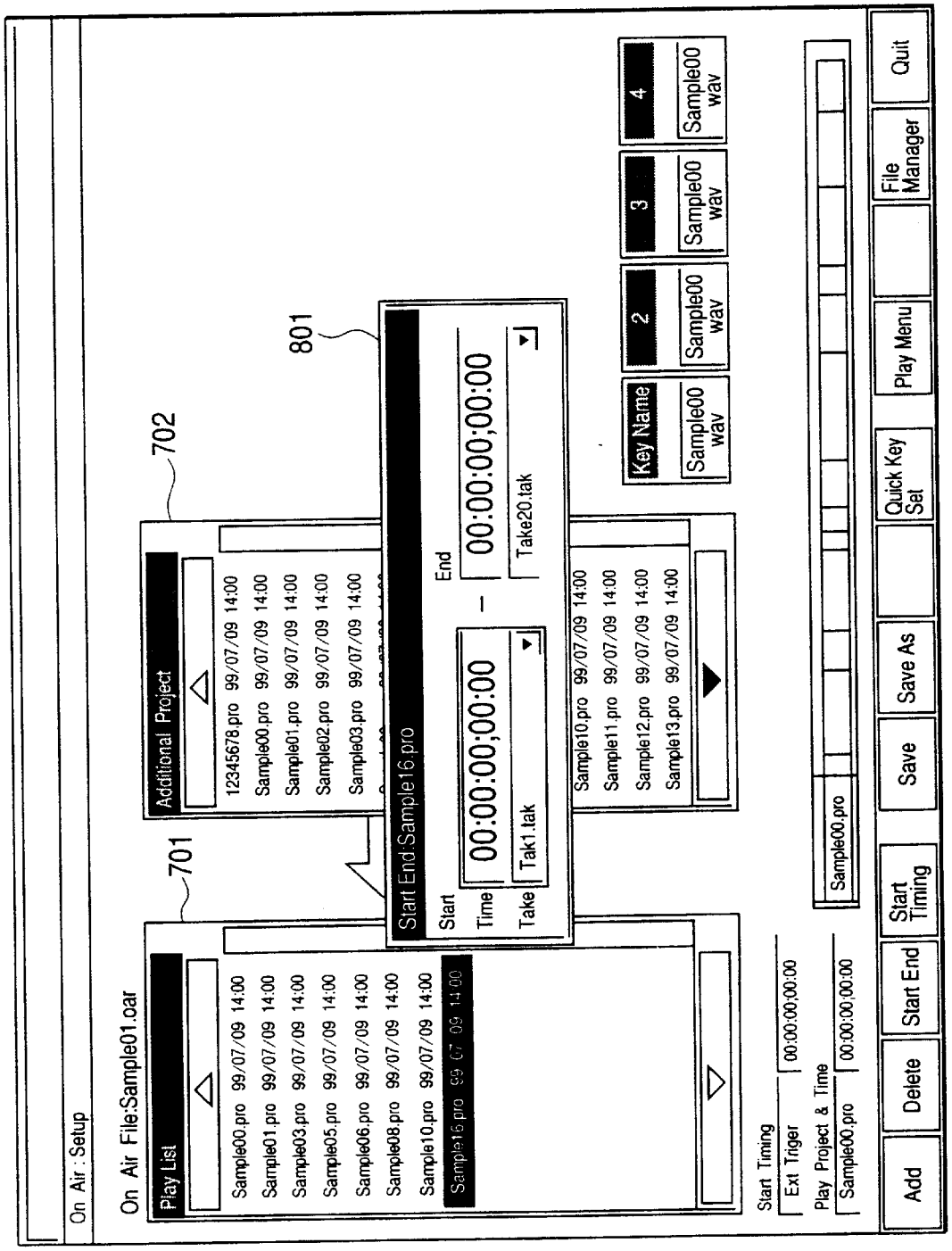
FIG. 8 is a view showing a fourth example of a screen displayed on a display in the case of performing a process of reproducing and broadcasting an audio signal or generating a series of audio signals for broadcasting according to the embodiment of the invention.
Figure 9:
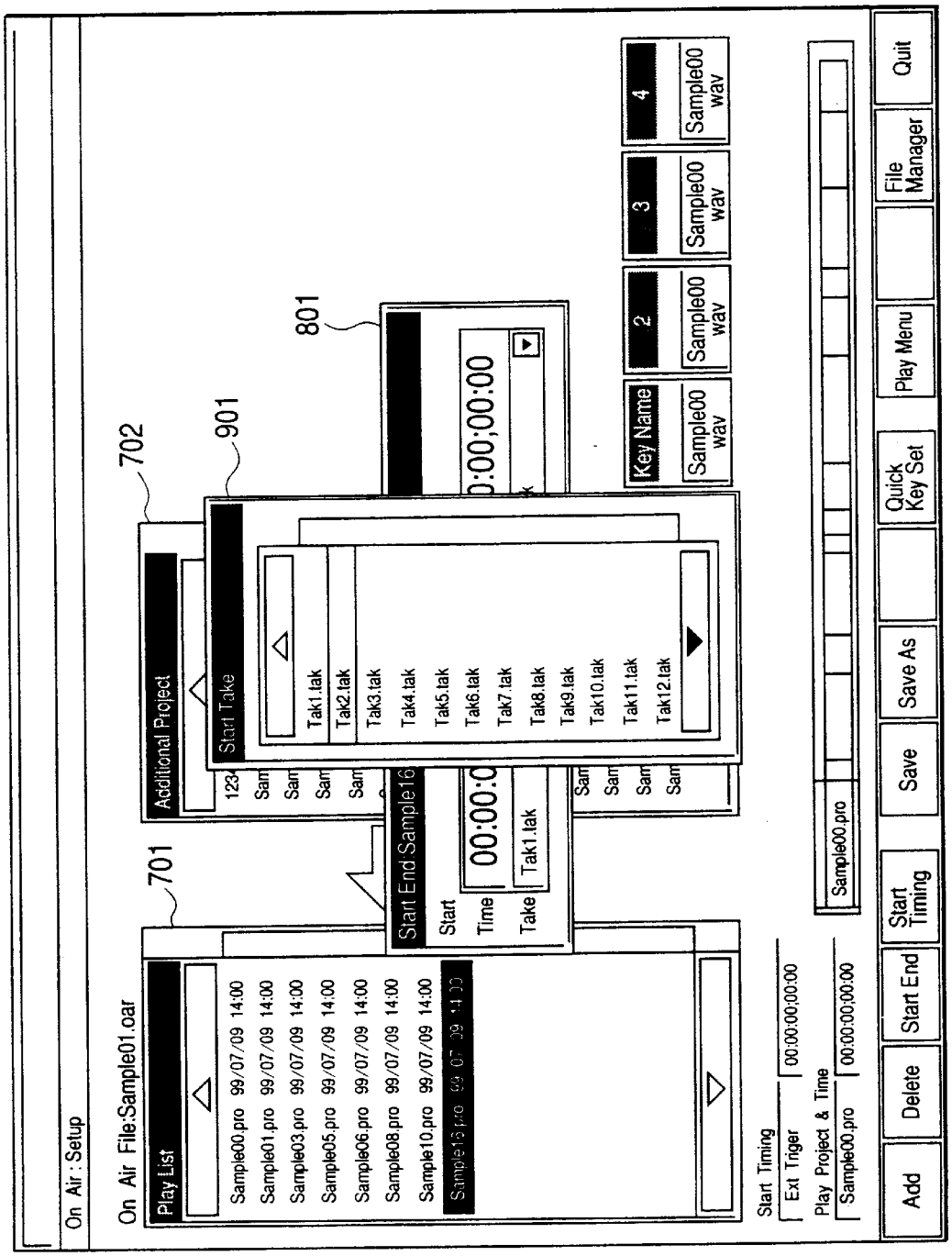
FIG. 9 is a view showing a fifth example of a screen displayed on a display in the case of performing a process of reproducing and broadcasting an audio signal or generating a series of audio signals for broadcasting according to the embodiment of the invention.

In the case of using a part of a program in the play list or a program to be added, after selecting one of the programs in the play list 701 as described above or when designating a program in the additional project 702 and adding the program into the play list 701, the operator operates the key F3 to which "Start End" is assigned. As a result, as shown in FIG. 8, a window 801 of "Start End" to designate either a part of the plurality of takes included in the program or a time period is opened. When the operator enters start time and end time by using the ten-key numerical pad in a state shown in FIG. 8, the time period in the selected program can be designated and determined by the enter key. In the case of designating a part in the plurality of takes included in the program, the operator selects the start side or end side of the column of "Take" in the window 801. As shown in FIG. 9, a window 901 showing a list of names Tak1 to Takn of a plurality of takes constructing the selected program is displayed. When the operator selects one of the takes in the state shown in FIG. 9 by using the cross-hair cursor key, the position of the take as a start in the plurality of takes included in the program or the position of the take as an end can be set and determined by the enter key.

By repeating the process as described above, a list of programs to be broadcasted can be created in the on-air list 701.

Figure 10:
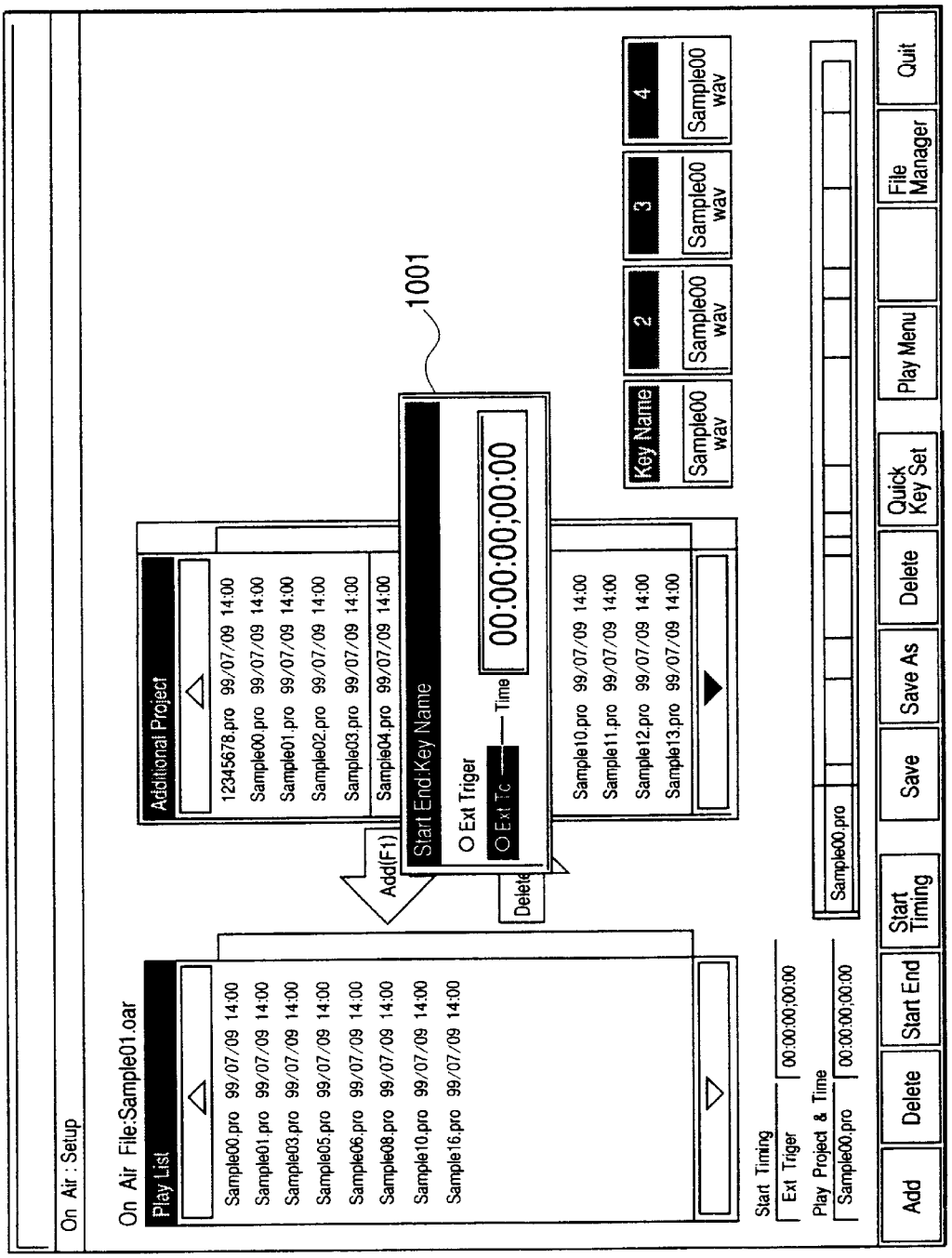
FIG. 10 is a view showing a sixth example of a screen displayed on a display in the case of performing a process of reproducing and broadcasting an audio signal or generating a series of audio signals for broadcasting according to the embodiment of the invention.

When the operator operates the key F4 to which "Start Timing" is assigned, as shown in FIG. 10, a window 1001 for setting the start timing is opened. Information to be set here is constructed by a time code "Ext Trigger" indicative of a start timing of the on-air file, which is given from the outside and a time code of the file to be started. The information is entered and set by using the crosshairs cursor keys. The set information is displayed as set information in a lower left part of the display screen.

According to the embodiment of the invention, four takes of various short sounds to be controlled by the quick play commander 136 can be added at the maximum into the on-air file described above, and are displayed so as to be selected in the buttons 703 shown in FIG. 7.

Figure 11:
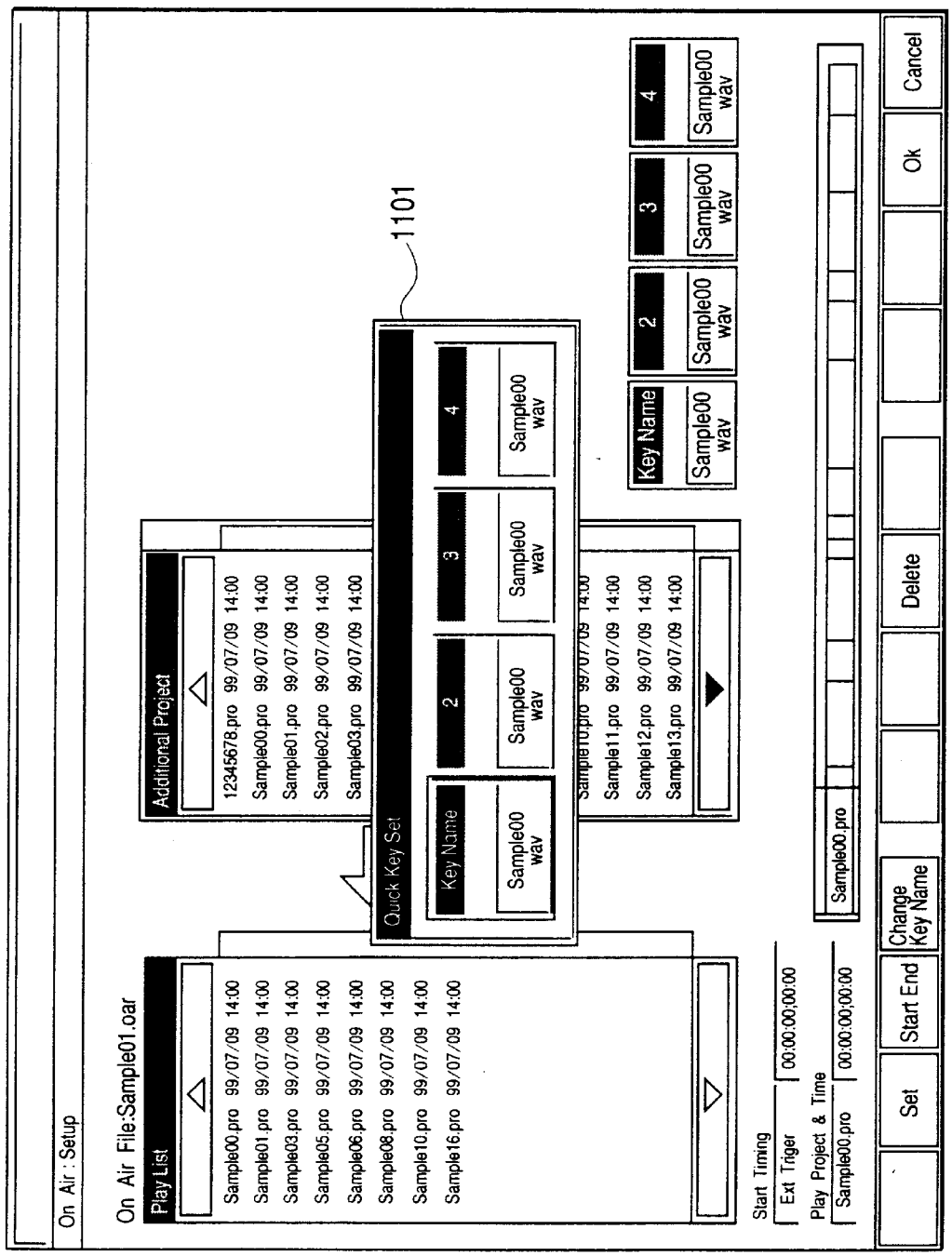
FIG. 11 is a view showing a seventh example of a screen displayed on a display in the case of performing a process of reproducing and broadcasting an audio signal or generating a series of audio signals for broadcasting according to the embodiment of the invention.

The take of a short sound to be used can be set by operating the key F8 to which "Quick Key Set" is assigned. More specifically, when the operator operates the key F8 in the display screen shown in FIG. 7, a window 1101 of "Quick Key Set" having four buttons to which takes of different short sounds are assigned is opened as shown in FIG. 11. The function of "Change Key Name" is assigned to the key F4. By operating the key F4, the name of a take associated with the button can be changed. In this case, the button to be changed is a button in which "Key Name" is displayed in the four buttons. The button to be changed can be designated by the crosshairs cursor keys The name in the portion in which "Key Name" is displayed (portion in which "2", "3", or "4" is displayed when any of the other buttons is selected) is changed.

Figure 12:
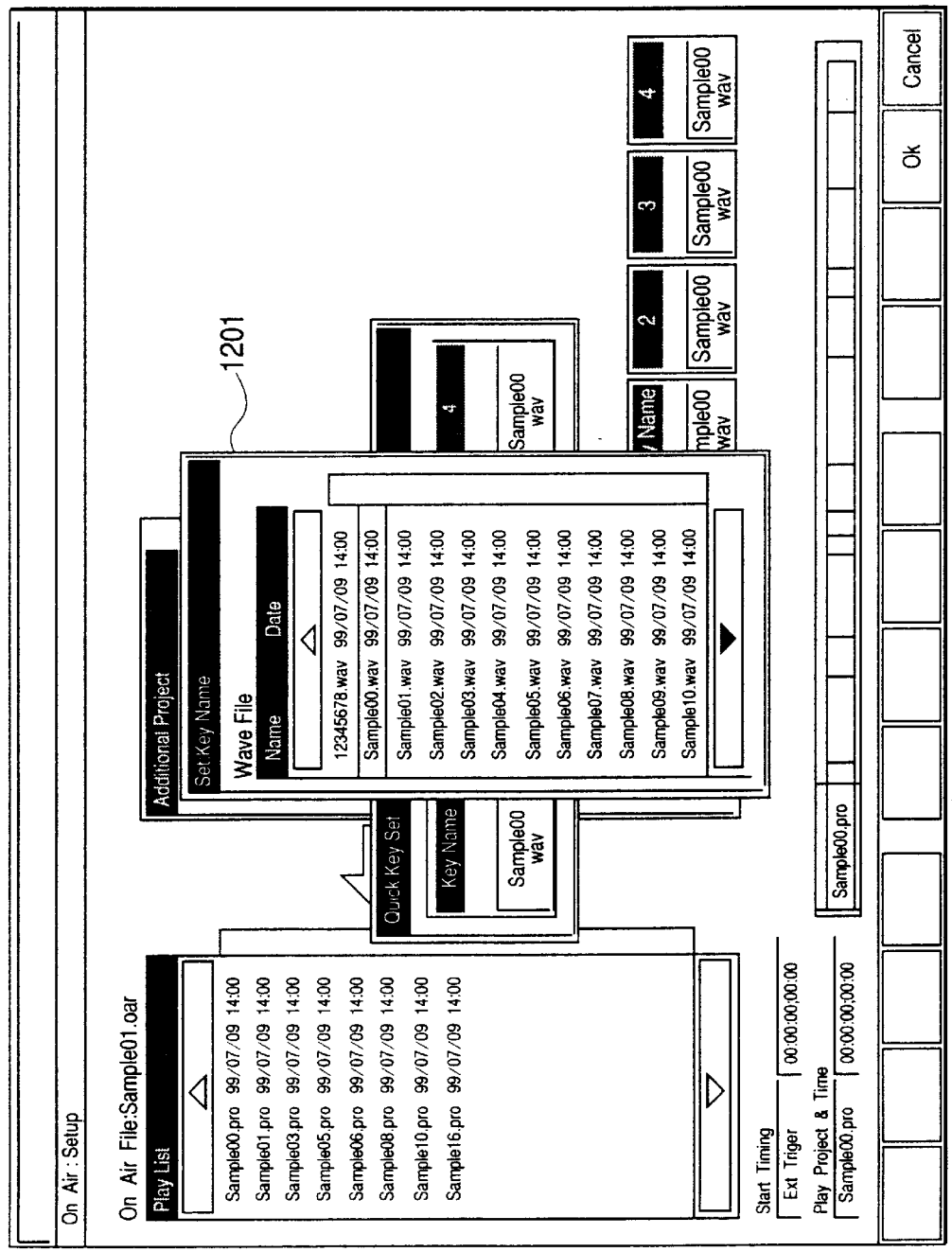
FIG. 12 is a view showing an eighth example of a screen displayed on a display in the case of performing a process of reproducing and broadcasting an audio signal or generating a series of audio signals for broadcasting according to the embodiment of the invention.
Figure 13:
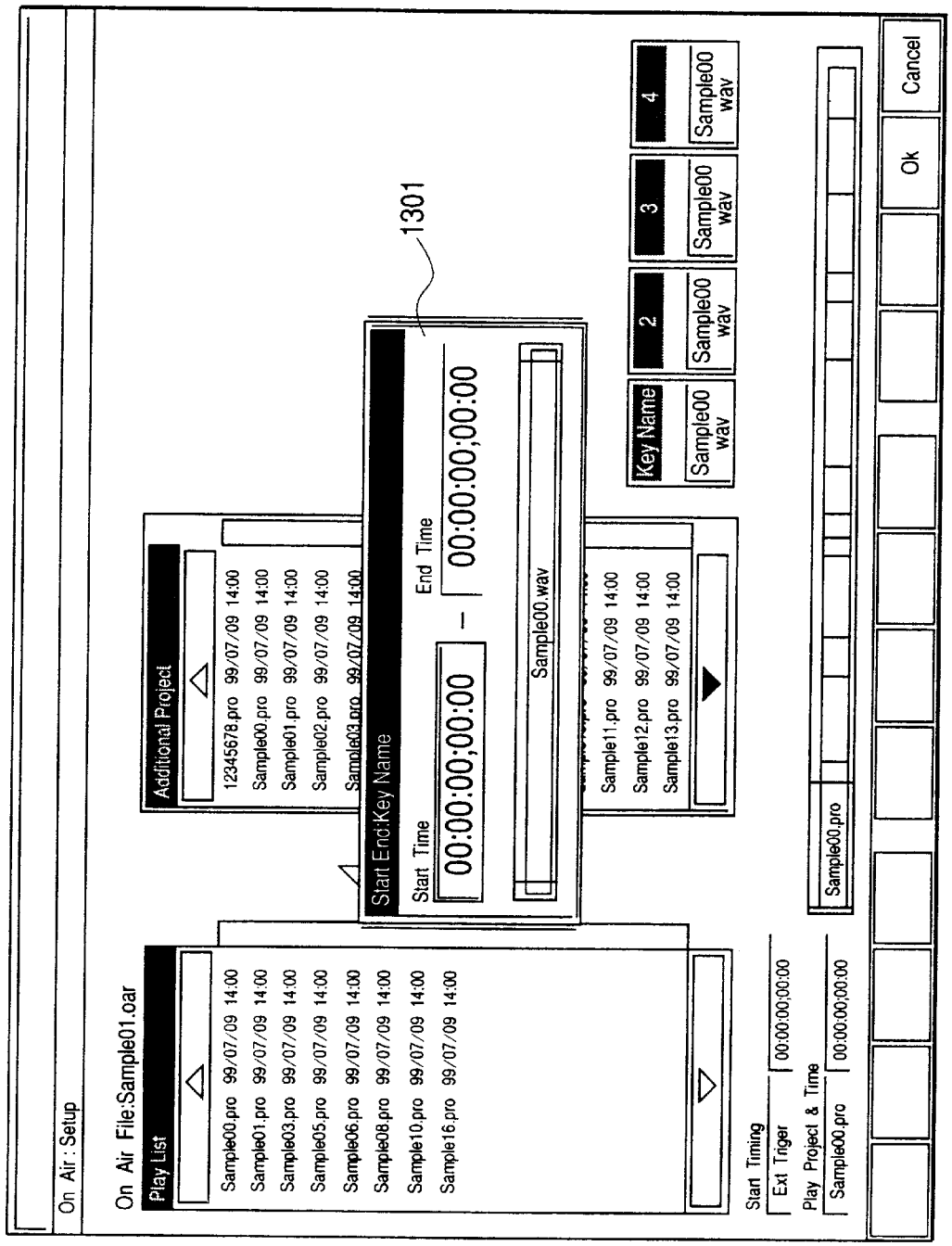
FIG. 13 is a view showing a ninth example of a screen displayed on a display in the case of performing a process of reproducing and broadcasting an audio signal or generating a series of audio signals for broadcasting according to the embodiment of the invention.

The contents of the take assigned to the button can be changed by using the key F2 to which the function of "Set" is assigned. First, one of the buttons is selected in the window 1101 by the crosshairs cursor keys and then the key F2 is operated, thereby starting the operation. When the key F2 is operated, a window 1201 of "Set:Key Name" is opened as shown in FIG. 12 and WAV files as a list of names of takes of sounds are displayed in the window 1201. When one of the WAV files is selected by the crosshairs cursor keys and the key F11 to which "OK" is assigned is operated, the contents of the take of a sound is assigned to the selected button. The contents of the take are displayed below the portion in which the name of the take in each button is displayed. Although "Sample00.wav" is written in the drawing, a specific sound (sound indicating that an answer to a quiz is correct and sound indicating that an answer to a quiz is incorrect) can be displayed. When the key F3 to which "Start End" is assigned is operated in this state, as shown in FIG. 13, a window 1301 of "Start End" for designating the time period in the take of sound is opened. In a manner similar to the case described by referring to FIG.

8, by entering the start time and end time by using the ten-key numerical pad, the time period to be used in the take of the designated sound can be also set.

Although the case of selecting the name of a take preset and assigning it to a button has been described above, the name of the take to be assigned to the button can be also entered by using the JIS keyboard.

Figure 14:
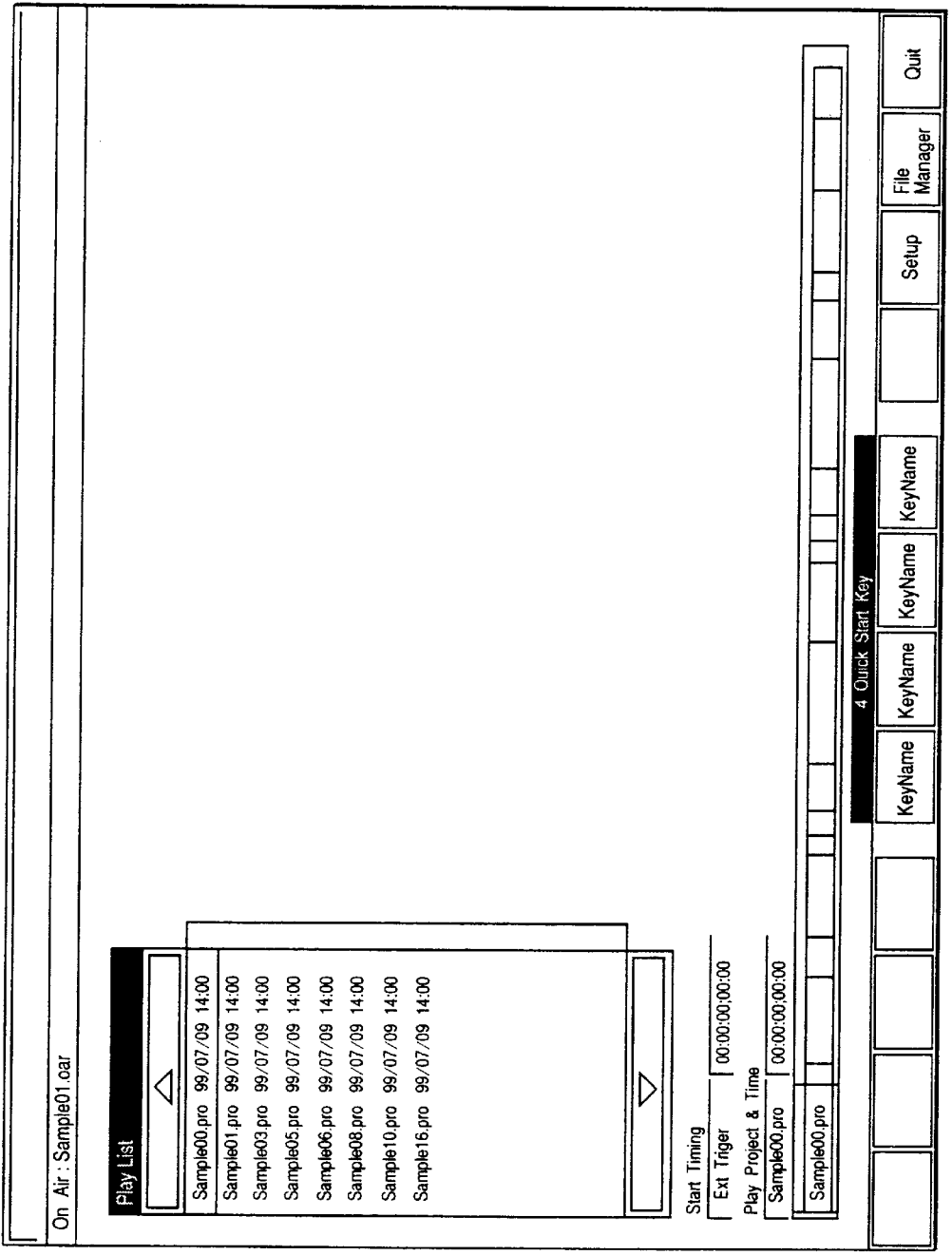
FIG. 14 is a view showing a tenth example of a screen displayed on a display in the case of performing a process of reproducing and broadcasting an audio signal or generating a series of audio signals for broadcasting according to the embodiment of the invention.

The above-described process is performed to create a new on-air file. An on-air file can be created by the operations described above. Reproduction can be carried out in a play screen shown in FIG. 14 by operating the key F9 to which the function of "Play Menu" is assigned. The created on-air file is automatically reproduced and broadcasted in response to a trigger from the outside by the above-described time code. As shown in FIG. 14, four names "Key Name" of takes of short sounds which have been set are assigned to keys F5 to F8. The operator who is monitoring the on-air state can superimpose any of the takes of short sounds assigned to the keys F5 to F8 on a signal which is being broadcasted.

FIGS. 15 to 18 are diagrams each showing an example of screen displayed on the display 147 when the process of assigning takes of various short sounds to a number of buttons of the quick play commander is performed according to the embodiment of the invention. The process of assigning takes of various short sounds to a number of buttons of the quick play commander according to the embodiment of the invention will be described hereinbelow with reference to the drawings.

Figure 15:
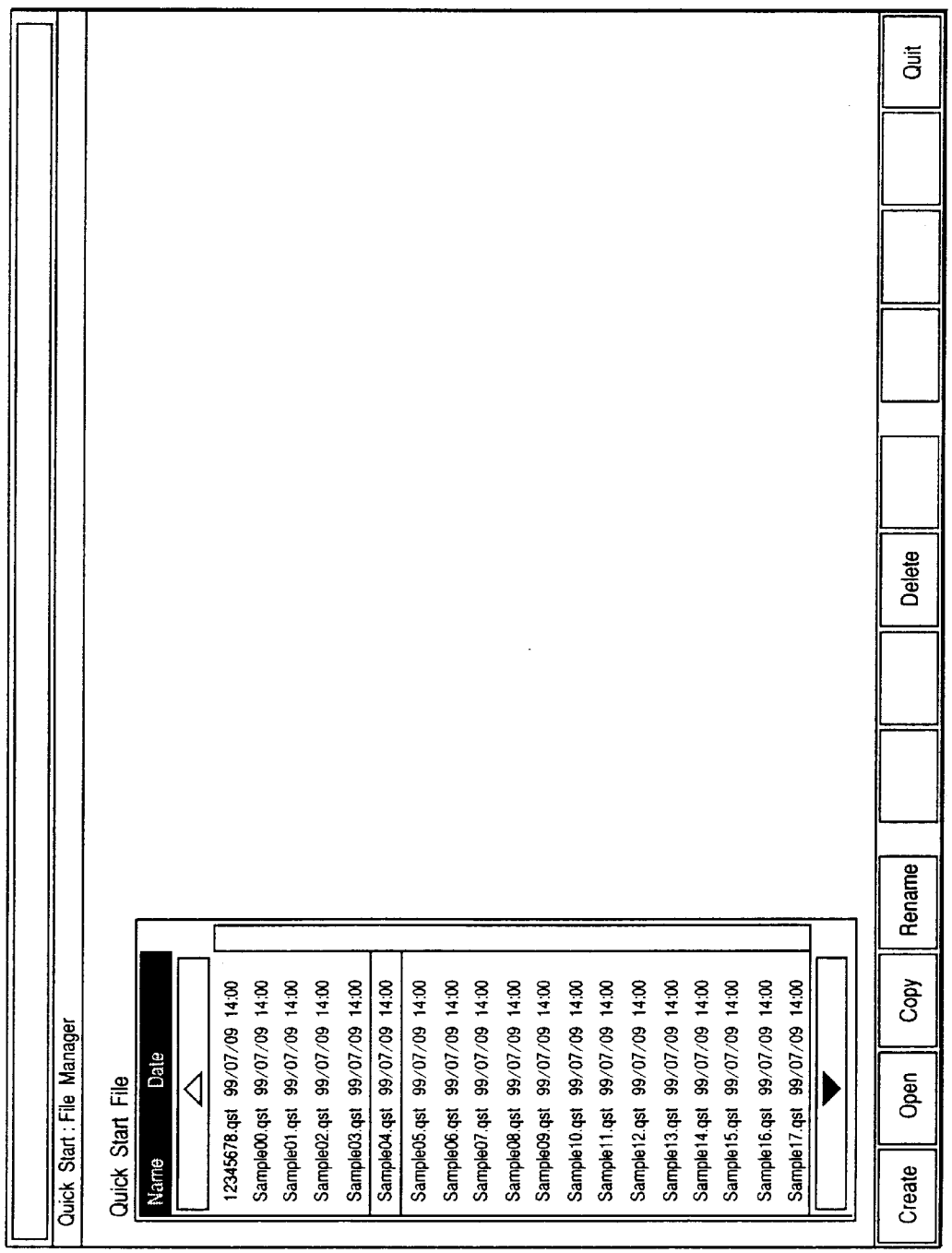
FIG. 15 is a view showing a first example of a screen displayed on a display in the case of performing a process of assigning takes of various short sounds to a number of buttons of a quick play commander according to the embodiment of the invention.

When the operator performs the process of assigning takes of various short sounds to the number of buttons of the quick play commander in the initial screen shown in FIG. 5 and operates the key F3 to which "Quick Start" is assigned, a screen as shown in FIG. 15 for starting the process of assigning takes of various short sounds to the number of buttons of the quick play commander by the process of "Quick Start" is displayed.

In the screen shown in FIG. 15, the name of the display screen, that is, "Quick Start:File Manager" and a list of takes of a number of short sounds already stored in the quick play commander are displayed. The takes are named and displayed as quick start files. Processing operations similar to those of the case described above are assigned to the function keys.

Figure 16:
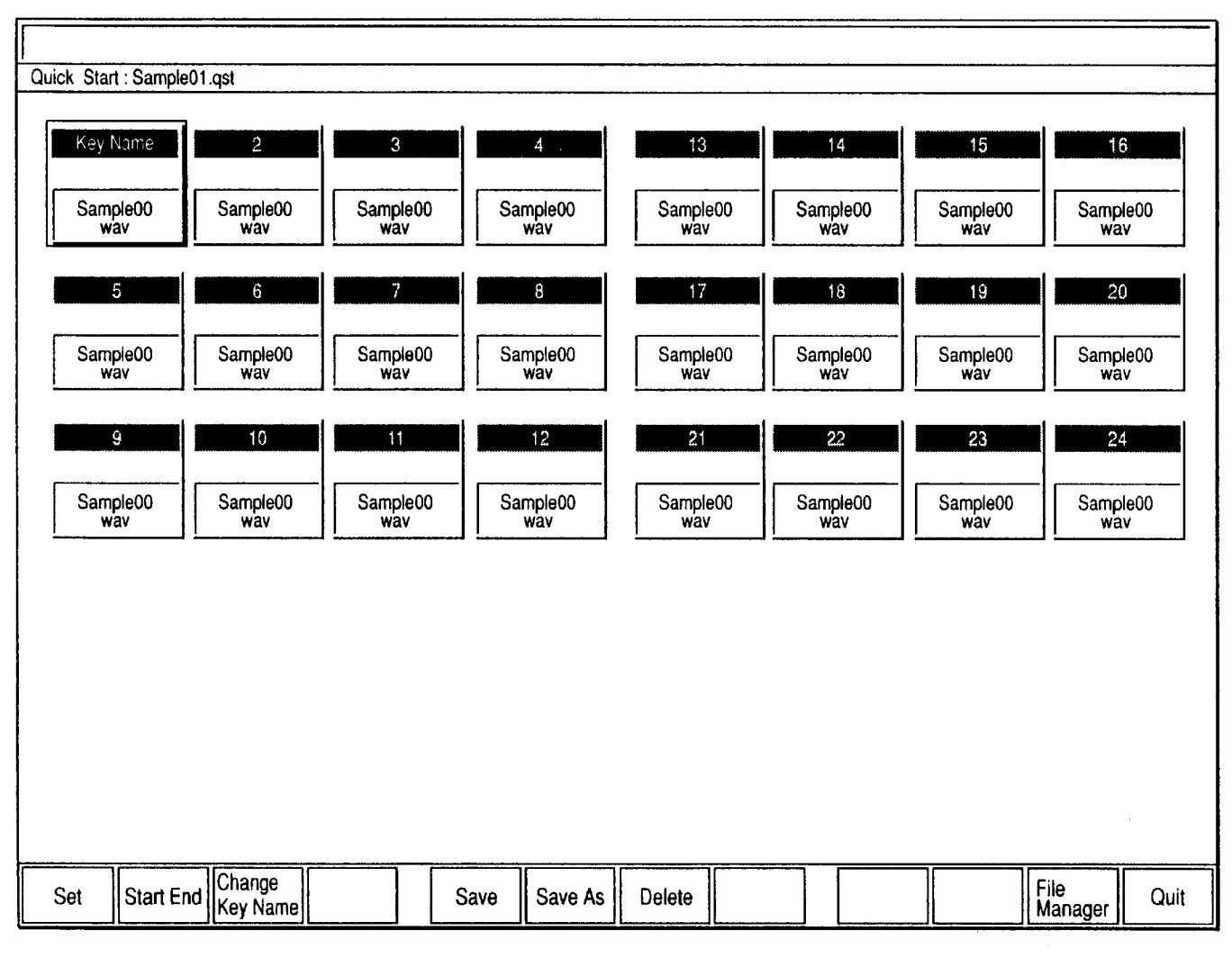

When the operator desires to select one of the takes in the file and create a new file or change the name, the operator operates the key F1 to which "Create" is assigned or the key F4 to which "Rename" is assigned. When the key F1 to which "Create" is assigned is operated, a window (not shown) for entering a new take name is opened and the name of the take can be entered. When the key F4 to which "Rename" is assigned is operated, a window for renaming is opened, and the name of a take can be changed by using the window. The result of the operation is reflected in a file shown in FIG. 15. After the processes, as shown in FIG. 16, a number of buttons arranged on the panel of the quick play commander are displayed in the same placement as that of the case of an actual panel of the quick play commander described with reference to FIG. 4. The functions of "Set", "Start End", and "Change Key Name" are assigned to the keys F1 to F3. The operator selects one of the displayed buttons by using the crosshairs cursor keys and then uses the keys F1 to F3, thereby enabling the name of the take and the contents of the take can be associated with each of the buttons.

Figure 17:
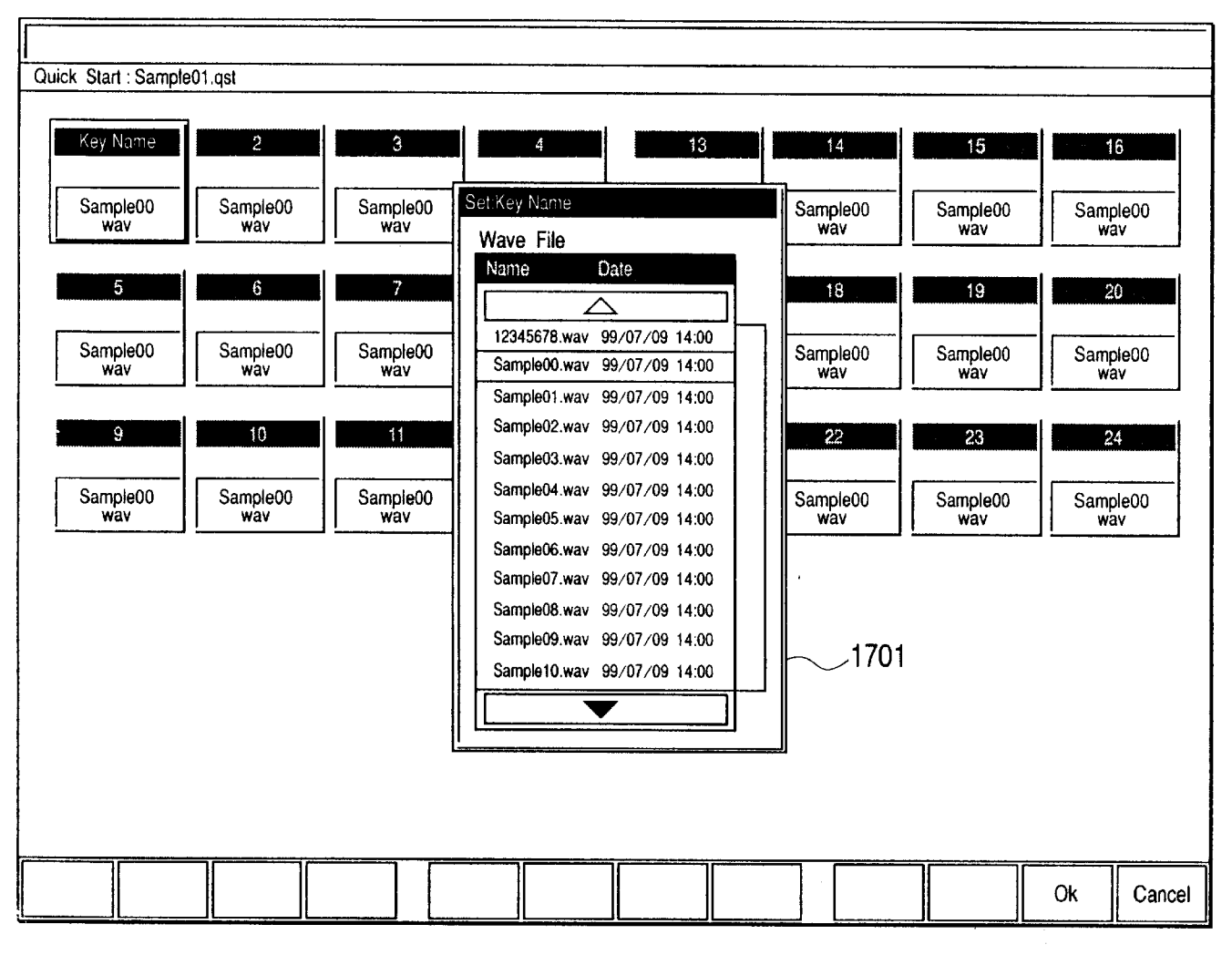
Figure 18:
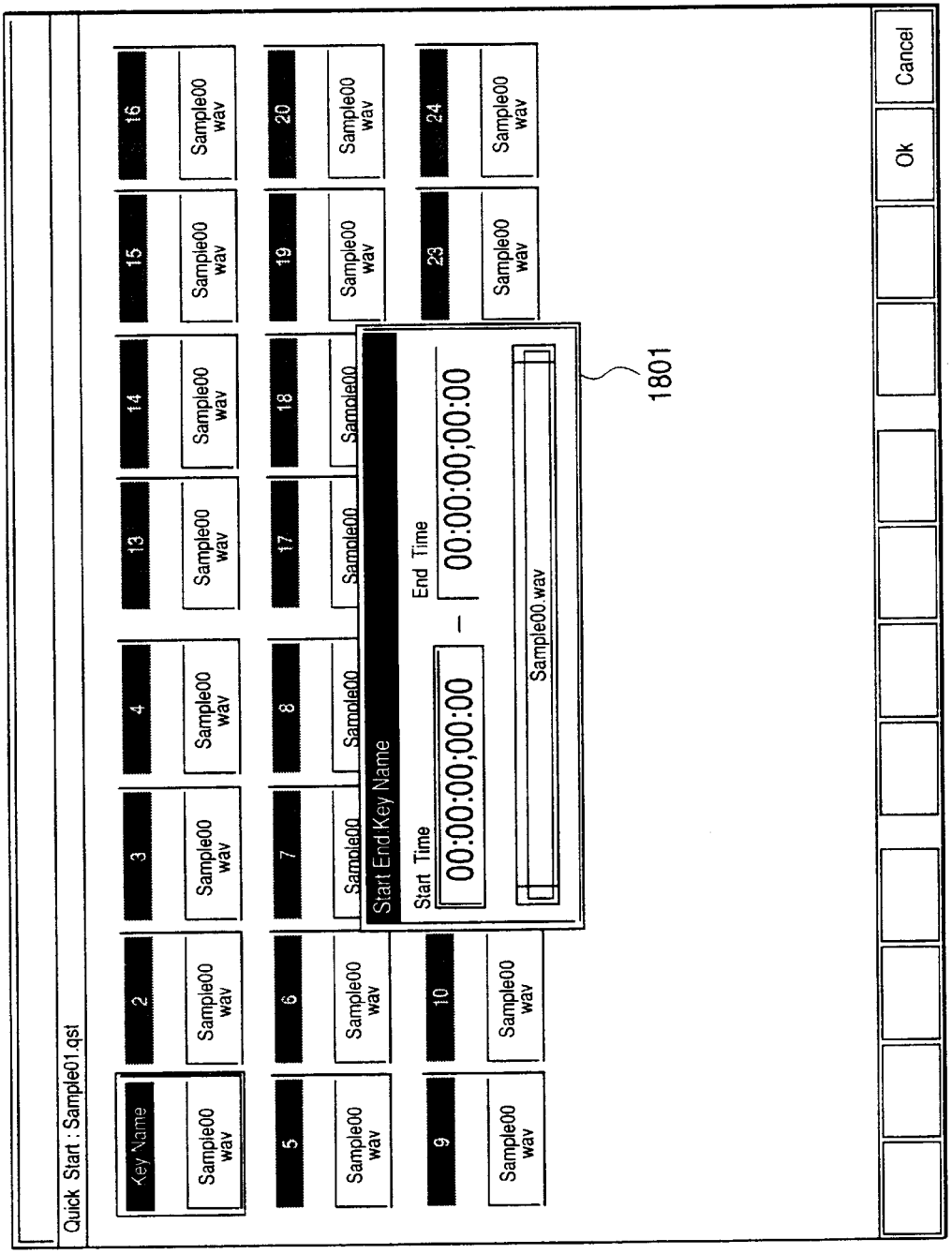
FIG. 18 is a view showing a fourth example of a screen displayed on a display in the case of performing a process of assigning takes of various short sounds to a number of buttons of a quick play commander according to the embodiment of the invention.

More specifically, when the operator selects one of the displayed buttons by operating the crosshairs cursor keys and operates the key F1 or F3, a window for entering a take change or a change in a button label (take name) is displayed. After the operator enters necessary information, as shown in FIG. 17, a window 1701 of "Set:Key Name" is opened and WAV files as a list of sounds included in the file selected in FIG. 15 are displayed. When one of the WAV files is selected by the crosshairs cursor keys and the key F11 to which "OK" is assigned is operated, the take name of a sound and the contents are assigned to the selected button. When the key F2 to which "Start End" is assigned is operated at this time, as shown in FIG. 18, a window 1801 of "Start End" for designating a time period in the take of the sound is opened. In a manner similar to the case which has been described with reference to FIG. 8, by entering the start time and the end time by the ten-key numerical pad, the time period to be used in the take of the designated sound can be also set.

Although it has been described that the preset name of the take is selected and assigned to a button, it is also possible to enter the name of the,take to be assigned to a button by using the JIS keyboard.

By repeating the processes as described above on each of buttons, the takes of various short sounds can be assigned together with their names to a number of buttons of the quick play commander. Any of the takes of a number of short sounds can be easily used only by pressing one of a number of buttons of the quick play commander either at the time of creating an on-air file or during broadcasting.

As described above, according to the invention, the easy of use is improved, the on-air file can be easily and efficiently created, a take of a short sound as an effect sound can be easily inserted into an on-air file, and a take of a short sound can be easily superimposed during broadcasted.

While the present invention has been described above in conjunction with the preferred embodiments, one of ordinary skill in the art would be enabled by this disclosure to make various modifications to this embodiment and still be within the scope and spirit of the invention as defined in the appended claims.

What is claimed is:

1. A digital audio disk recorder having a display for displaying a state of broadcasting and a recording and reproducing apparatus, for creating an on-air file by an edited audio signal recorded in the recording and reproducing apparatus and broadcasting the on-air file, comprising:

memory means for memorizing takes of a plurality of short sounds; and output means for outputting the take of short sound during broadcasting;

wherein said output means comprises a number of buttons to which respective takes of a plurality of short sounds are assigned, and said display displays a plurality of icons at positions corresponding to the positions of said respective buttons comprised in said output means, and titles showing respective takes of a plurality of short sounds which are assigned to said respective buttons are provided for said icons.

2. A digital audio disk recorder according to claim 1, wherein a timing of outputting the take of short sound is instructed during broadcasting by operating the button.

3. A digital audio disk recorder according to claim 1, wherein the on-air file is created as a play list of a plurality of project files and, when a project file is added to the play list, each of start and end of the project file to be added is designated by time or a position in placement of a plurality of takes included in the file.

4. A digital audio disk recorder according to claim 1, wherein the recording and reproducing apparatus comprises an MO device and an operating device, and MO drive is provided on the front face of the operating device.

* * * * *